United States Patent

Waier

[11] 4,312,452
[45] Jan. 26, 1982

[54] VEHICLE THEFT PROTECTION DEVICE

[76] Inventor: Vincent J. Waier, 1435 Sheffield, Saginaw, Mich. 48603

[21] Appl. No.: 145,990

[22] Filed: May 2, 1980

[51] Int. Cl.³ .............. B60R 25/00; B60T 3/00; E05B 65/12; E05B 65/19
[52] U.S. Cl. .............................. 211/23; 70/19; 70/237; 70/240; 188/32; 211/8; 211/175; 211/208; 292/258; 248/505; 248/551
[58] Field of Search .............. 188/32; 52/66, 67; 70/237, 240, 235, 58, 62, 19, 18, 258; 49/49; 292/258, 259, 288; 211/5, 4, 23, 204, 206, 208, 8, 175; 248/505, 551, 552

[56] References Cited

U.S. PATENT DOCUMENTS

| | | | |
|---|---|---|---|
| 488,395 | 12/1892 | Justice | 188/32 X |
| 511,367 | 12/1893 | Slater | 211/23 X |
| 594,433 | 11/1897 | Sheldon | 211/23 X |
| 1,692,679 | 11/1928 | McGoogan | 211/204 X |
| 1,745,057 | 1/1930 | Romine | 248/505 X |
| 1,791,997 | 2/1931 | Benton | 49/49 X |
| 1,812,826 | 6/1931 | Frick | 292/288 UX |
| 2,521,088 | 9/1950 | Phelps | 188/32 X |
| 2,885,090 | 5/1959 | Forman et al. | 211/175 |
| 3,547,258 | 12/1970 | Black | 211/175 X |
| 3,695,071 | 10/1972 | West | 70/18 UX |
| 3,695,394 | 10/1972 | Carpenter | 188/32 |
| 3,941,406 | 3/1976 | Eggleston | 211/5 X |
| 3,964,610 | 6/1976 | Deiner | 70/235 X |
| 4,107,958 | 8/1978 | Manley, Jr. | 211/8 X |
| 4,182,454 | 1/1980 | Tohms | 70/235 X |

FOREIGN PATENT DOCUMENTS

| | | | |
|---|---|---|---|
| 479363 | 7/1929 | Fed. Rep. of Germany | 188/32 |
| 986002 | 3/1951 | France | 52/66 |
| 258495 | 5/1949 | Switzerland | 211/5 |
| 251400 | 6/1926 | United Kingdom | 52/66 |

*Primary Examiner*—Roy D. Frazier
*Assistant Examiner*—Carl F. Pietruszka

[57] ABSTRACT

A frame into which a forward end of an automotive vehicle is driven, and secured, so as to prevent vehicle theft, the frame including adjustable bars, so as to clamp snugly against the vehicle, and, in one design, also including rollers against the vehicle wheels, that prevent the vehicle from riding off the frame.

1 Claim, 5 Drawing Figures

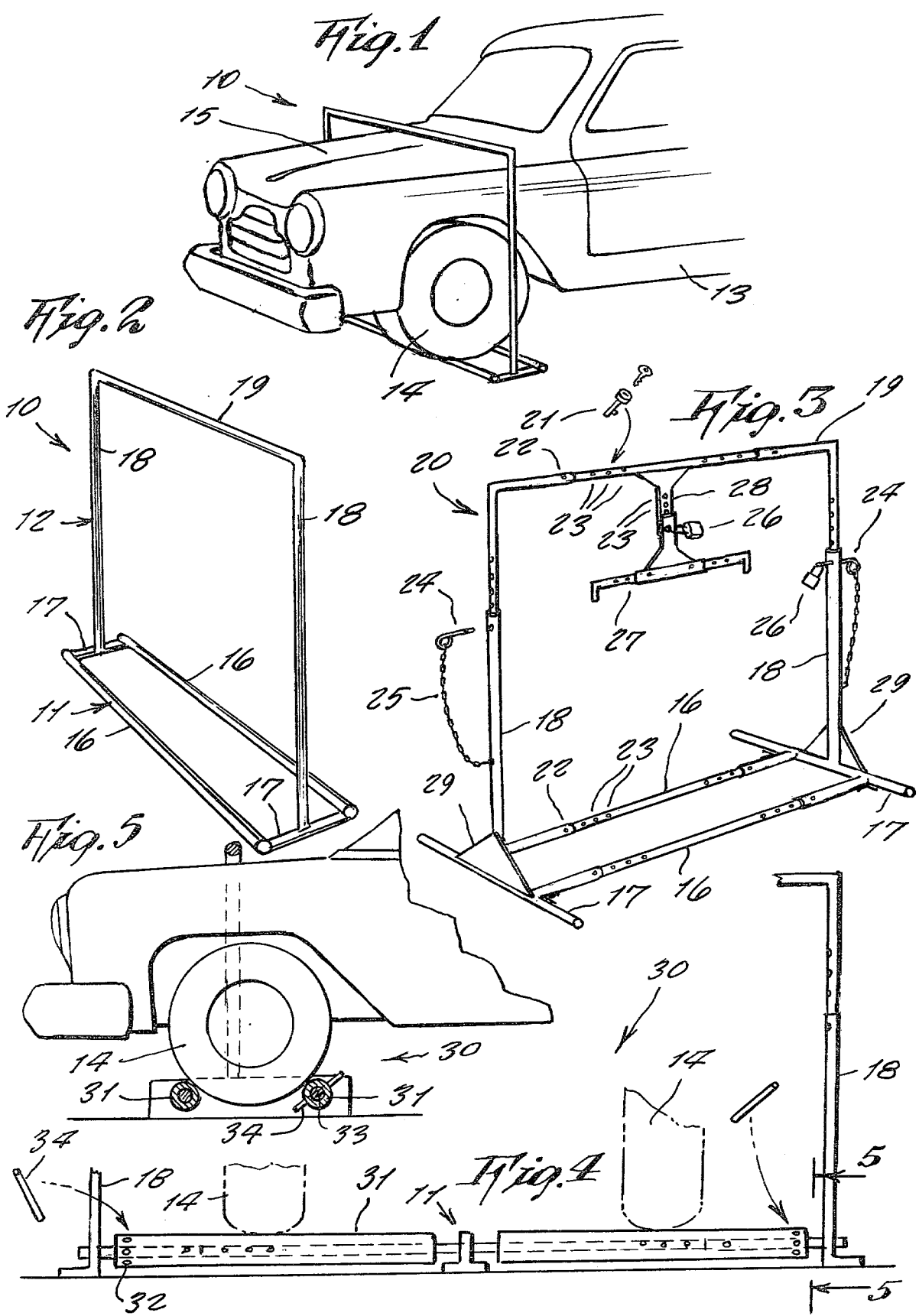

VEHICLE THEFT PROTECTION DEVICE

This invention relates generally to vehicle antitheft devices.

It is well known, that most vehicle thefts are those wherein the vehicle is left parked for a relatively long period, such as in parking lots and the like, and where the presence of persons among the vehicles does not attract suspision, so that a thief can concentrate on selection of a vehicle, without notice.

It is a principal object of the present invention to provide a vehicle theft protection device, wherein a parked vehicle is placed inside of a stationary frame, from which it cannot be readily extricated by an unauthorized stranger, and thus is safer against being stolen.

Another object is to provide a vehicle theft protection device, that is adaptable for all types of automotive vehicles, such as passenger cars, trucks, buses and the like, by being readily adjustable in size.

Other objects are to provide a vehicle theft protection device, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of one design of the invention, shown in use by an automobile;

FIG. 2 is a perspective view of the invention, shown alone;

FIG. 3 is a perspective view of another design of the invention;

FIG. 4 is a fragmentary rear view of still another design thereof, wherein rotatable rollers are fitted on one of the bars, across which the vehicle wheels travel; the rollers being made non-rotatable when a motorist drives his car on to the device, by first inserting a cross pin through each roller and the axle, and, after being thus parked, the motorist then removes the cross pins, and either keeps them or hides them in the car, so that, if anyone tries to drive the car off the device, the rollers cause the wheels to spin without traction, so that the car cannot be moved, until the motorist later restores the cross pins, and FIG. 5 is a cross-sectional view, taken on line 5—5 of FIG. 4.

Referring now to the drawing in greater detail, and more particularly to FIGS. 1 and 2 thereof at this time, the reference numeral 10 represents a vehicle theft protection device, according to the present invention, wherein there is a base 11, for resting upon the ground, and an upstanding yoke 12, rigidly affixed upon the base, so as together to form a frame, into which an automotive vehicle 13 is driven, until the vehicle front wheels 14 are rested upon the base, while the yoke extends across the top of the vehicle engine hood 15, preventing the hood from being raised.

The base consists of a pair of parallel bars 16, welded at their ends to short cross bars 17, comprising feet of the device. The yoke comprises a pair of legs 18 and a top cross bar 19, welded together and to the base cross bars. All the bars of the device may be either solid steel or a strong pipe.

In use, the vehicle is driven into the frame opening, and is halted when the wheels rest between the bars 16, so that the weight of the wheels is upon both of the bars, thus preventing the device from being shifted relative to the vehicle.

In another design 20 of the device, each of the bars 16, 18 and 19 are telescopically adjustable to fit any vehicle, and securable in selected size by lock-fitted bolts 21, fitted through a hole 22, selectively aligned with any one of a row of holes 23, and a cross hole on an end of the pin receives a padlock 26, as shown.

In this design, an additional bar 27 is supported under the cross bar 19 by a brace 28 therebetween; both the cross bar 19 and brace being telescopically adjustable, and securable in selected size by the means described above. The ends of the cross bar 27 are downwardly bent. This structure serves to lock against a boat, snowmobile, yard machine or other item carried upon the bed of a truck, which is entered under the frame.

The frame in design 20 is further strengthened by the feet ends being extended, and a gusset plate 29 being secured between each foot and leg.

In still another design 30 of the invention, a pair of rotatable rollers 31 are fitted on each bar 16, so that the vehicle wheels rest on the rollers. A plurality of holes 32, transversely through each roller, can be selectively aligned with a single hole 33 extending transversely through the bar 16, and a pin 34 inserted therethrough, so as to lock the rollers from rotation, when a vehicle is to be driven into the frame. Thereafter, the pin is removed by the motorist, so that the unattended, parked vehicle cannot be driven out of the frame by an unauthorized person. The motorist stores the pin inside the locked vehicle, or in his pocket.

While various changes may be made in the detail construction, it is understood that such changes will be within the spirit and scope of the present invention, as is defined by the appended claims.

What I now claim is:

1. A vehicle theft protection device, comprising, in combination, a base, and a yoke affixed upon said base, so as to form an upright frame around a central opening, into which a vehicle can be driven, so that wheels of said vehicle rest upon said base, while said frame surrounds said vehicle; said frame being telescopically adjustable in size; said base comprising a pair of parallel, spaced-apart bars, secured at opposite ends to downward legs of said yoke, a rotatable roller around each said bar, and means for selectively locking said rollers from rotation around said bars, said means comprising a plurality of radially extending holes through each of said rollers, which are selectively aligned with a transverse hole in each said bar, and a removable pin being inserted through said aligned holes.

* * * * *